US011186706B2

(12) United States Patent
Tran et al.

(10) Patent No.: US 11,186,706 B2
(45) Date of Patent: Nov. 30, 2021

(54) MACHINE DIRECTION ORIENTED FILMS COMPRISING MULTIMODAL COPOLYMER OF ETHYLENE AND AT LEAST TWO ALPHA-OLEFIN COMONOMERS

(71) Applicant: Borealis AG, Vienna (AT)

(72) Inventors: Anh Tuan Tran, Linz (AT); Paulo Cavacas, Coutada (PT); Audrey Gensous, Dax (FR)

(73) Assignee: Borealis AG, Vienna (AT)

( * ) Notice: Subject to any disclaimer, the term of this patent is extended or adjusted under 35 U.S.C. 154(b) by 321 days.

(21) Appl. No.: 16/097,319

(22) PCT Filed: Apr. 28, 2017

(86) PCT No.: PCT/EP2017/060285
§ 371 (c)(1),
(2) Date: Oct. 29, 2018

(87) PCT Pub. No.: WO2017/186953
PCT Pub. Date: Nov. 2, 2017

(65) Prior Publication Data
US 2020/0325316 A1 Oct. 15, 2020

(30) Foreign Application Priority Data

Apr. 29, 2016 (EP) .................................... 16167801

(51) Int. Cl.
| | | |
|---|---|---|
| *C08F 210/16* | (2006.01) |
| *C08L 23/08* | (2006.01) |
| *B29C 48/00* | (2019.01) |
| *B29C 48/10* | (2019.01) |
| *B29C 55/00* | (2006.01) |
| *B29C 55/28* | (2006.01) |
| *C08J 5/18* | (2006.01) |
| *A01F 15/07* | (2006.01) |
| *B29K 23/00* | (2006.01) |
| *B29L 23/00* | (2006.01) |

(52) U.S. Cl.
CPC ...... *C08L 23/0815* (2013.01); *B29C 48/0018* (2019.02); *B29C 48/022* (2019.02); *B29C 48/10* (2019.02); *B29C 55/005* (2013.01); *B29C 55/28* (2013.01); *C08F 210/16* (2013.01); *C08J 5/18* (2013.01); *A01F 15/0715* (2013.01); *A01F 2015/0745* (2013.01); *B29K 2023/08* (2013.01); *B29L 2023/001* (2013.01); *C08F 2500/05* (2013.01); *C08F 2500/16* (2013.01); *C08J 2323/08* (2013.01); *C08J 2423/08* (2013.01); *C08L 2203/16* (2013.01); *C08L 2205/025* (2013.01)

(58) Field of Classification Search
CPC .......................... C08F 210/16; C08F 2500/05;
C08F 2500/16; C08L 23/0815; C08L
2205/02; C08L 2205/025; C08L 2205/03;
B29C 55/06
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,532,311 A | 7/1985 | Fulks et al. |
| 4,543,399 A | 9/1985 | Jenkins, III et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 5,514,455 A | 5/1996 | Michie, Jr. et al. |
| 8,461,280 B2 * | 6/2013 | Eriksson ............... C08F 210/16 526/352.2 |
| 10,385,194 B2 * | 8/2019 | Kela ..................... C08F 210/16 |
| 10,494,465 B2 * | 12/2019 | Kela ......................... C08J 5/18 |
| 10,619,036 B2 * | 4/2020 | Tupe ...................... B32B 27/08 |

(Continued)

FOREIGN PATENT DOCUMENTS

| | | |
|---|---|---|
| EP | 0188125 | 7/1986 |
| EP | 0250169 | 12/1987 |

(Continued)

OTHER PUBLICATIONS

International Search Report and Written Opinion issued for International Application No. PCT/EP2017/060285, dated Jun. 12, 2017.

*Primary Examiner* — Rip A Lee
(74) *Attorney, Agent, or Firm* — Meunier Carlin & Curfman LLC

(57) ABSTRACT

A machine direction oriented film comprising a multimodal copolymer of ethylene and at least two alpha-olefin-comonomers having: a) a density of from 906 to 925 kg/m³ determined according to ISO 1183, b) an MFR$_{21}$ of 10-200 g/10 min determined according to ISO1133, wherein the multimodal copolymer of ethylene comprises c) a first copolymer of ethylene and a first alpha-olefin comonomer having 4 to 10 carbon atoms; and d) a second copolymer of ethylene having an alpha-olefin comonomer different from the first copolymer, said second alpha-olefin comonomer having 6 to 10 carbon atoms.

18 Claims, 2 Drawing Sheets

(56) References Cited

U.S. PATENT DOCUMENTS

| | | |
|---|---|---|
| 2010/0304062 A1 * | 12/2010 | Daviknes ................ B32B 27/32 428/35.2 |
| 2012/0238720 A1 | 9/2012 | Lam et al. |
| 2014/0094533 A1 | 4/2014 | Karjala et al. |
| 2014/0094583 A1 | 4/2014 | Karjala et al. |
| 2014/0199557 A1 | 7/2014 | Naito et al. |
| 2014/0205821 A1 | 7/2014 | Walther et al. |

FOREIGN PATENT DOCUMENTS

| | | |
|---|---|---|
| EP | 0479186 | 4/1992 |
| EP | 0499759 | 8/1992 |
| EP | 0560035 | 9/1993 |
| EP | 0579426 | 1/1994 |
| EP | 0600414 | 6/1994 |
| EP | 0684871 | 12/1995 |
| EP | 0688794 | 12/1995 |
| EP | 0696293 | 2/1996 |
| EP | 0699213 | 3/1996 |
| EP | 0707513 | 4/1996 |
| EP | 0721798 | 7/1996 |
| EP | 810235 | 12/1997 |
| EP | 0891990 | 1/1999 |
| EP | 1310295 | 5/2003 |
| EP | 1415999 | 5/2004 |
| EP | 1591460 | 11/2005 |
| EP | 1941998 | 7/2008 |
| EP | 2067799 | 6/2009 |
| EP | 2172510 | 4/2010 |
| EP | 2698251 | 2/2014 |
| EP | 2826624 | 1/2015 |
| EP | 2883885 | 6/2015 |
| EP | 2883887 | 6/2015 |
| EP | 3307813 A1 | 4/2018 |
| EP | 3307814 A1 | 4/2018 |
| JP | 2014-234395 | 12/2012 |
| JP | 2014234395 A * | 12/2014 ................ C08J 5/18 |
| WO | 94/25495 | 11/1994 |
| WO | 96/19503 | 6/1996 |
| WO | 96/32420 | 10/1996 |
| WO | 99/51646 | 10/1999 |
| WO | 00/26258 | 5/2000 |
| WO | 00/29452 | 5/2000 |
| WO | 01/05845 | 1/2001 |
| WO | 01/55230 | 8/2001 |
| WO | 03/106510 | 12/2003 |
| WO | 2005/087361 | 9/2005 |
| WO | 2005/118655 | 12/2005 |
| WO | 2007/025640 | 3/2007 |
| WO | 2009/114661 | 9/2009 |
| WO | 2010/111869 | 10/2010 |
| WO | 2010/144784 | 12/2010 |
| WO | 2011/002986 | 1/2011 |
| WO | 2011/002998 | 1/2011 |
| WO | 2011032176 | 3/2011 |
| WO | 2011085375 | 7/2011 |
| WO | 2012044504 | 4/2012 |
| WO | 2012057975 | 5/2012 |
| WO | 2012134700 | 10/2012 |
| WO | 2013002997 | 1/2013 |
| WO | 2013006276 | 1/2013 |
| WO | 2013046615 | 4/2013 |
| WO | 2013095969 | 6/2013 |
| WO | 2014003837 | 1/2014 |
| WO | 2014190036 | 11/2014 |
| WO | 2016198271 | 12/2016 |
| WO | 2016198273 | 12/2016 |

* cited by examiner

MACHINE DIRECTION ORIENTED FILMS COMPRISING MULTIMODAL COPOLYMER OF ETHYLENE AND AT LEAST TWO ALPHA-OLEFIN COMONOMERS

The present invention is directed to a MDO film comprising a multimodal polyethylene copolymer comprising a first copolymer of ethylene and a second copolymer of ethylene, said multimodal polyethylene copolymer comprising at least two alpha-olefin comonomers. In particular, the invention relates to the formation of a MDO film suited for silage formation which has excellent toughness and tear resistance. The invention also provides a process for forming these machine direction oriented films and silage packaged within such a film.

BACKGROUND OF THE INVENTION

This invention relates to films designed for the manufacture of silage. Silage is fermented, high-moisture stored fodder which can be fed to cattle, sheep and other such ruminants. It is fermented and stored in a process called ensilage, ensiling or silaging, and is usually made from grass crops, including maize, sorghum or other cereals, using the entire green plant (not just the grain). Silage can be made from many field crops. Silage is typically prepared by placing cut green vegetation in a silo or pit, by piling it in a large heap and compressing it down so as to leave as little oxygen as possible and then covering it with a plastic sheet. Alternatively, the material is tightly wrapped by a plastic film in large round bales. The films of the present invention can be used as covering films but ideally are used in bale formation.

The silage films of this invention allow generation of the aerobic conditions necessary for silage fermentation. They enable the bales to maintain high energy and nutrition value in the silage.

The film must also be able to withstand the rigours of baling. It will be appreciated that a baling machine is used to prepare square or round bales of grass crop which turns into silage. The bailer puts a large stress on any film it employs. As the bale exits the baler it falls onto a field covered in recently cut crop stubble which can pierce the film. Bales are often stacked putting further stress on the film and so on. Bales might be lifted using a pitchfork or mechanical lifter, again stressing the film.

Stretch film efficiency is therefore a combination of film performance needs, such as: stretch strength and load retention, excellent tear resistance, excellent puncture resistance and toughness, bespoke tack/cling, oxygen and water barrier, UV stabilization, opacity and colour density. It is also important that the film has operational efficiency at the stretch wrapper, such as higher meters of film per reel to reduce downtime and reel changes.

Higher meters per reel is achieved through down gauging of the film with pre-stretching being the most advanced film process set up to achieve it. The challenge with stretching however, is the ability to keep film performance, such as tear resistance and toughness while reducing the film thickness.

Films of use in the invention therefore need to perform in a difficult environment. Toughness and tear resistance requirements include:

Reduction of breakages at the start of the bale wrapping cycle (time saving)
Ensuring efficient wrapping on both round & square bales across variety of crops on all types of bale wrappers.
High Tear Resistance required both before & after pre-stretching;
Withstanding the forces of ejection from the turntable onto sharp crop stubble recently cut (& combat their damage),
Withstanding rigorous bale handling or pick up by modern, complex wrapping machinery;
Stacking and stocking afterwards to withstand piercing dry stalks and angular corners of square bales and combat damage from birds, rodents, domestic pets etc. on storage;
Resisting the elements.

We have now found a particular multimodal copolymer is ideal for making MDO films suitable for silage production.

The polymer used in the films itself is not new and similar polymers are known in the art for other applications.

EP2883887 discloses a multimodal ethylene copolymer prepared in three stages using Ziegler Natta catalysis. The target films are used in food applications. There is no suggestion of orientation of the films.

US2012/0238720 describes multimodal copolymers which are employed in films with good optics.

EP2067799 describes monolayer or multilayer films with excellent impact strength based on multimodal LLDPE.

There is however no suggestion of the use of multimodal films we claim in oriented form and their suitability for use in the manufacture of silage.

SUMMARY OF INVENTION

Viewed from one aspect the invention provides a machine direction oriented film comprising a multimodal copolymer of ethylene and at least two alpha-olefin-comonomers having:
a) a density of from 906 to 925 kg/m$^3$ determined according to ISO 1183,
b) an $MFR_{21}$ of 10-200 g/10 min determined according to ISO 133,
wherein the multimodal copolymer of ethylene comprises
c) a first copolymer of ethylene and a first alpha-olefin comonomer having 4 to carbon atoms; and
d) a second copolymer of ethylene having an alpha-olefin comonomer different from the first copolymer, said second alpha-olefin comonomer having 6 to 10 carbon atoms.

It is preferred if component d) does not contain the residue of an alpha olefin with fewer than 6 carbons atoms. It is preferred if there is at least one alpha olefin present in the component d) which is different from any alpha olefin present in component c).

MDO films are preferably stretched uniaxially in the machine direction (MD) in a draw ratio of at least 1:1.5, such as at least 1:2.

Viewed from another aspect the invention provides a machine direction oriented film comprising a multimodal copolymer of ethylene and at least two alpha-olefin-comonomers having:
a) a density of from 906 to 925 kg/m$^3$ determined according to ISO 1183,
b) an $MFR_{21}$ of 10-200 g/10 min determined according to ISO1133,
wherein the multimodal copolymer of ethylene comprises
c) a first copolymer of ethylene comprising at least a first and a second fraction; said first fraction comprising ethylene and a first alpha-olefin comonomer having 4 to 10 carbon atoms and said second fraction comprising ethylene and the first alpha-olefin comonomer having 4 to 10 carbon atoms; and d) a second copolymer of ethylene having an alpha-olefin comonomer different from the first copolymer, said second alpha-olefin comonomer having 6 to 10 carbon atoms.

Viewed from another aspect the invention provides a machine direction oriented film comprising a multimodal copolymer of ethylene and at least two alpha-olefin-comonomers having:

a) a density of from 906 to 925 kg/m³ determined according to ISO 1183,
b) an $MFR_{21}$ of 10-200 g/10 min determined according to ISO1133,
wherein the multimodal copolymer of ethylene comprises
c) a first copolymer of ethylene comprising at least a first and a second fraction; said first fraction comprising ethylene and a first alpha-olefin comonomer having 4 to 10 carbon atoms and said second fraction comprising ethylene and the first alpha-olefin comonomer having 4 to 10 carbon atoms; and
d) a second copolymer of ethylene having an alpha-olefin comonomer different from the first copolymer, said second alpha-olefin comonomer having 6 to 10 carbon atoms having a density of below 900 kg/m³ when calculated according to Equation 5, based on values determined according to ISO 1183.

Viewed from another aspect the invention provides the use of a MDO film as hereinbefore defined in packaging silage.

Viewed from another aspect the invention provides a process for the formation of a MDO film as hereinbefore defined comprising blowing a multimodal copolymer of ethylene and at least two alpha-olefin-comonomers having:

a) a density of from 906 to 925 kg/n determined according to ISO 1183,
b) an $MFR_{21}$ of 10-200 g/10 min determined according to ISO1133,
wherein the multimodal copolymer of ethylene comprises
c) a first copolymer of ethylene and a first alpha-olefin comonomer having 4 to carbon atoms; and
d) a second copolymer of ethylene having an alpha-olefin comonomer different from the first copolymer, said second alpha-olefin comonomer having 6 to 10 carbon atoms;
so as to form a first film;
stretching said first film in the machine direction in a draw ratio of at least 1:1.5.

Viewed from another aspect the invention provides a process for the preparation of a machine direction oriented film comprising:

in a first reactor polymerising ethylene and a first alpha-olefin comonomer having 4 to 10 carbon atoms so as to produce a first polyethylene fraction;

in a second reactor and in the presence of the first polyethylene fraction, polymerising ethylene and said first alpha-olefin comonomer having 4 to 10 carbon atoms so as to produce a second polyethylene fraction, said first and second polyethylene fractions forming a first copolymer of ethylene;

in a third reactor and in the presence of the first copolymer of ethylene, polymerising ethylene and a second alpha-olefin comonomer different from the first alpha-olefin comonomer, said second alpha-olefin comonomer having 6 to 10 carbon atoms so as to produce a second copolymer of ethylene;

said first and second copolymers of ethylene forming a multimodal copolymer of ethylene and at least two alpha-olefin-comonomers having:

a) a density of from 906 to 925 kg/m³ determined according to ISO 1183,
b) an $MFR_{21}$ of 10-200 g/10 min determined according to ISO1133,
blowing said multimodal copolymer of ethylene as to form a first film;
stretching said first film in the machine direction in a draw ratio of at least 1:1.5.

Viewed from another aspect the invention comprises a bale comprising silage or a precursor thereto packaged within a MDO film as hereinbefore defined.

Definitions

The multimodal copolymer of use in this invention can generally be regarded as an LLDPE. The term LLDPE means linear low density polyethylene herein.

The films of the invention are uniaxially oriented in the machine direction (MDO). They are preferably not biaxially oriented films.

DETAILED DESCRIPTION OF INVENTION

This invention relates to an MDO film comprising a particular multimodal copolymer. The use of this copolymer in MDO films has enabled the formation of a film that is ideally suited for silage formation.

Multimodal Ethylene Copolymer

By multimodal ethylene copolymer is meant a copolymer which contains distinct components having different average molecular weights, different contents of comonomer or both. Preferably, the copolymer contains distinct components having different average molecular weights. The multimodal copolymer of the present invention is produced by copolymerizing ethylene and at least two comonomers in two or more polymerization stages where the polymerization conditions are sufficiently different to allow production of different polymers in different stages.

The "first copolymer" is defined as the polymer produced in the first polymerization step (preferably a loop reactor or loop reactors). This first copolymer may comprise two or more fractions. The fractions are further denominated as "first fraction of the first copolymer", "second fraction of the first copolymer", etc.

A "first copolymer mixture" is defined as sum of all polymer fractions produced in the first polymerization step, i.e. prepolymerization, any first or second fraction of the first copolymer.

Similar a "second copolymer" is defined as the polymer produced in the second polymerization step, differing from the first polymerization step, preferably done in a gas-phase-reactor.

Similar, a "second copolymer mixture" is defined as sum of all polymer fractions produced in the second polymerization step, i.e. any first or second fraction of the first copolymer and the second copolymer.

The multimodal ethylene copolymer of the invention is a copolymer of ethylene and at least two alpha-olefin comonomers, whereby the multimodal ethylene copolymer comprises a first copolymer of ethylene and an alpha-olefin comonomer having from 4 to 10 carbon atoms and a second copolymer of ethylene and an alpha-olefin comonomer having from 6 to 10 carbon atoms. There must be at least two different comonomers present, i.e. both components cannot be ethylene hex-1-ene copolymers.

It is preferred if the comonomers present in the first and second copolymers are different. Ideally any comonomer used in the first copolymer is not used in the manufacture of the second copolymer.

Preferably the multimodal ethylene copolymer is a copolymer of ethylene and at least two comonomers selected from 1-butene, 1-hexene, and 1-octene.

It is further preferred that the multimodal ethylene copolymer is a copolymer of ethylene and exactly two comonomers selected from 1-butene, 1-hexene, or 1-octene. Especially preferred is a multimodal ethylene copolymer comprising a first copolymer comprising ethylene and 1-butene, and
a second copolymer comprising ethylene and 1-hexene.

Even more preferred is a multimodal ethylene copolymer comprising a first copolymer consisting of ethylene and 1-butene and
a second copolymer of ethylene consisting of ethylene and 1-hexene.

The multimodal ethylene copolymer has a final density p of from 906 to 925 kg/m$^3$, preferably 910 to 925 kg/m$^3$ and more preferably from 913 to 923 kg/m$^3$. The resins having densities lower than 906 kg/m$^3$ tend to be so sticky that their production becomes problematic in a particle forming process. On the other hand, the resins having a final density of more than 925 kg/m$^3$ do not have the required balance of properties required in the end use applications for the multimodal ethylene copolymer, such as they are not sufficiently soft and they may have a too low tear strength.

The multimodal ethylene copolymer has a melt flow rate $MFR_{21}$ of 10-200 g/10 min, preferably from 20-150 g/10 min, such as 25-100 g/min, such as 28-80 g/10 min. The resins having an $MFR_{21}$ of less than 10 g/10 min tend to have too high melt viscosity so that the throughput in a converting process may become restricted.

On the other hand, the resins having $MFR_{21}$ of more than 200 g/10 min have too low melt strength for the end use applications. In addition, the combination of a high melt index with a low density of the resin often causes the resin particles to be sticky and this causes problems in a particle forming process, such as plugging and fouling of process equipment. In addition, the multimodal ethylene copolymer can have a flow rate ratio $FRR_{2/15}$ of at least 15 or more, such as 20 or 23 or more. Furthermore, it can have a flow rate ratio $FRR_{21/5}$ in the range of 15-40, preferably in the range of 20-35.

The multimodal ethylene copolymer preferably has a melt flow rate $MFR_5$ of 0.1-20 g/10 min, preferably from 0.5-10 g/10 min, such as 0.5-8.0 g/min, especially 0.5-5.0 g/10 mi. The $MFR_5$ is preferably from 0.8 to 4.0 g/10 min.

First Copolymer

The first copolymer of ethylene comprises ethylene and a first alpha-olefin comonomer having 4 to 10 carbon atoms, such as I-butene, 1-hexene or 1-octene, more preferably 1-butene.

In a preferred embodiment the first copolymer consists of ethylene and 1-butene. The first copolymer of ethylene preferably has a melt flow rate $MFR_2$ of from 150-1500 g/10 min, such as 150 to 1000 g/10 min, preferably from 150 to 750 g/10 min and more preferably from 180 to 600 g/10 min. Furthermore, the first copolymer may have a density of from 945 to 955 kg/m$^3$, preferably from 945 to 953 kg/m$^3$ and most preferably from 948 to 953 kg/m$^3$.

The first copolymer of ethylene is ideally produced in a first polymerization stage which is preferably a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the first polymerization stage is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582, 816, 3,405,109, 3,324,093, EP-A-479186 and U.S. Pat. No. 5,391,654. It is thus preferred to conduct the first polymerization stage as a slurry polymerization in one or more loop reactors, more preferably in two consecutive loop reactors.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerization stage continuously.

Hydrogen is introduced into the first polymerization stage for controlling the $MFR_2$ of the first copolymer. The amount of hydrogen needed to reach the desired MFR depends on the catalyst used and the polymerization conditions. The desired polymer properties have been obtained in slurry polymerization in a loop reactor with the molar ratio of hydrogen to ethylene of from 100 to 1000 mol/kmol (or mol/1000 mol) and preferably of from 200 to 800 mol/kmol.

The first alpha-olefin comonomer is introduced into the first polymerization stage for controlling the density of the first copolymer. As discussed above, the comonomer is an alpha-olefin having from 4 to 10 carbon atoms, preferably 1-butene, 1-hexene or 1-octene, more preferably 1-butene. The amount of comonomer needed to reach the desired density depends on the comonomer type, the catalyst used and the polymerization conditions. The desired polymer properties have been obtained with 1-butene as the comonomer in slurry polymerization in a loop reactor with the molar ratio of comonomer to ethylene of from 100 to 1000 mol/kmol (or mol/1000 mol) and preferably of from 200 to 800 mol/kmol.

The average residence time in the first polymerization stage is typically from to 120 minutes, preferably from 30 to 80 minutes. As it is well known in the art the average residence time T can be calculated from:

$$\text{Residence Time } \tau = \frac{Vr}{Qo} \qquad \text{Equation 3}$$

where Vr is the volume of the reaction space (in case of a loop reactor, the volume of the reactor, in case of the fluidized bed reactor, the volume of the fluidized bed) and Qo is the volumetric flow rate of the product stream (including the polymer product and the fluid reaction mixture).

The production rate in the first polymerization stage is suitably controlled with the catalyst feed rate. It is also possible to influence the production rate by suitable selection of the monomer concentration in the first polymerization stage. The desired monomer concentration can then be achieved by suitably adjusting the ethylene feed rate into the first polymerization stage.

According to the present invention, it is beneficial that the particles of the first copolymer of ethylene and the first alpha-olefin comonomer have a narrow distribution for the residence time. This is seen to pose advantages in view of the homogeneity of the particles, namely in view of a more homogenous catalyst activity when producing the second copolymer in the subsequent gas-phase-reactor, leading to a more even distribution of the gas-phase-reactor-fraction in/around these particles and a lower amount of easily extractable low-molecular-weight fractions.

Without being bound to any theory inventors believe, that a certain minimum residence time in the first polymerization steps influences the catalyst activity in the sense, that densities can be better controlled in the subsequent gas-phase-reactor.

So the present inventors have identified a way to create a more homogenous polymer fraction of the first copolymer of ethylene and the first alpha-olefin comonomer by splitting the production process and producing the first copolymer in two consecutive polymerization stages, such as two loop reactors. The polymer produced in each such polymerization stage or set of reaction conditions in one reaction stage or in one polymerization reactor is herewith denominated as "fraction of the first copolymer", namely "first fraction of the first copolymer", "second fraction of the first copolymer, etc.

It is thus preferred if the first copolymer is produced in two loop reactors in series. The first loop reactor forms a first fraction and the second loop reactor forms a second fraction of the first copolymer component.

This split production mode leads to a more homogenous residence time of the particles of the first copolymer of ethylene and the first alpha-olefin comonomer when entering the second polymerisation stage (typically in GPR) and hence more uniform properties of the particles produced in the second polymerization step, i.e. gas-phase-reactor, in view of viscosity and density.

These two properties, namely viscosity and density in combination, have then decisive influence on the final properties of the final multimodal copolymer of ethylene and any articles produced thereof.

Inventors also identified, that the more uniform properties of the particles produced in the first copolymerization step are further essential to achieve very low densities in the GPR in combination with low MFR of the second ethylene copolymer produced in the GPR.

So in a special embodiment the multimodal ethylene copolymer of the present invention comprises a first and a second copolymer of ethylene as mentioned above, wherein the first copolymer of ethylene comprises at least a first and a second fraction.

These two or more fractions of the first copolymer of ethylene may be unimodal in view of their molecular weight and/or their density or they can be bimodal in respect of their molecular weight and/or their density.

It is preferred that the two or more fractions of the first copolymer are unimodal in view of their molecular weight and density. This first and second fraction (and any further fraction) of the first copolymer of ethylene and the first alpha-olefin comonomer can be produced by any of the known process in the art.

However it is preferred, that both fractions are produced with the same technology, especially by applying the same method and polymerization settings as disclosed with the "first copolymer"-section above.

It is within the scope of the invention, that the first and the second fraction of the first copolymer of ethylene and the first alpha-olefin comonomer are present in a ratio of 4:1 up to 1:4, such as 3:1 to 1:3, or 2:1 to 1:2, or 1:1.

It is further preferred, that the two or more fractions of the first copolymer of ethylene are produced in two or more consecutive reactors according to the same process and method as given further above under "First copolymer".

For a person skilled in the art it will be clear that—when producing the first and the second fraction of the first copolymer of ethylene and the first alpha-olefin comonomer in two consecutive reactors, there can (or even has to) be a certain difference in the $MFR_2$-values and density-values of each fraction.

It is hence understood within the meaning of the invention, that—given the preferred MFR-range of 150 to 1500 g/10 min—both the $MFR_2$ after loop 1 and after loop2 of the first copolymer of ethylene are to be within the range of 150-1500 g/10 mi.

Further, the $MFR_2$ after loop2 can be up to double or 1.5 times the $MFR_2$ after loop1 or can be the same. Ideally, the MFR increases from first to second fraction. Accordingly it is understood within the scope of the invention, that—at the density range in between 945 and 955 $kg/m^3$—the densities of the first and after the second (and after any further) fraction of the first copolymer may differ by at most 3 $kg/m^3$ and still be understood as having been produced with the same process condition.

Example

| Loop density after 1 | Loop density after loop 2 | |
| --- | --- | --- |
| 950 | 953 | Same condition |
| 954 | 951 | Same condition |
| 955 | 950 | Different condition |

All fractions of the first copolymer are copolymeric and are ideally based on the same comonomer(s). In a preferred embodiment therefore the first fraction is an ethylene butene copolymer and the second fraction is an ethylene butene copolymer.

Second Copolymer

The second copolymer of ethylene comprises ethylene and a second alpha-olefin comonomer having 6 to 10 carbon atoms, such as 1-hexene or 1-octene, more preferably 1-hexene.

It is further preferred that the second alpha-olefin comonomer has more carbon atoms than the first alpha-olefin monomer.

It is further preferred that the second alpha-olefin comonomer has 2 more carbon atoms than the first alpha-olefin monomer.

In a preferred embodiment the second copolymer consists of ethylene and 1-hexene.

Without being bound to any theory the present inventors consider that the use of alpha-olefin comonomers having 6 to 10 carbon atoms facilitates the creation of tie-molecules already at lower molecular weight than it would be possible with lower alpha-olefin comonomer such as 1-butene. This easier formation of tie-molecules has significant benefits when it comes to mechanical properties.

The second copolymer is produced in the presence of any previously produced polymer component, i.e. in the presence of at least the first copolymer of ethylene, optionally any fractions of the first copolymer and any prepolymerization-components, forming the so-called "second copolymer mixture".

It is well understood for a person skilled that the density or viscosity ($MFR_{21}$) of the second copolymer as such cannot be measured because the second copolymer cannot be isolated out of the second copolymer mixture and from the first copolymer.

However, the $MFR_{21}$ of the second copolymer can be calculated by using the so called Hagström equation (Hagström, The Polymer Processing Society, Europe/Africa Region Meeting, Gothenburg, Sweden, Aug. 19-21, 1997).

$$\text{Hagström formula } MI_b = \left( w \cdot MI_1^{-\frac{w-b}{a}} + (1-w) \cdot MI_2^{-\frac{w-b}{a}} \right)^{-a \cdot w^b} \quad \text{Equation 4}$$

As proposed by Hagström, a=10.4 and b=0.5 for $MFR_{21}$. Further, unless other experimental information is available, $MFR_{21}/MFR_2$ for one polymer component (i.e. first copolymer or second copolymer) can be taken as 30. Furthermore, w is the weight fraction of the polymer component having higher MFR. The first copolymer can thus be taken as the component 1 and the second copolymer as the component 2. The $MFR_{21}$ of the second copolymer (MI2) can then be solved from equation 1 when the MFR21 of the first copolymer mixture (MI1) and the second copolymer mixture (MIb) are known.

Preferably the second copolymer of ethylene and a second alpha olefin comonomer has an $MFR_{21}$ of <20 g/0 min when calculated according to Equation 4: Hagström formula.

The content of the comonomer in the second copolymer is controlled to obtain the desired density of the second copolymer mixture.

The density of the second copolymer cannot be directly measured. However, by using the standard mixing rule of Equation 5 the density of the second copolymer can be calculated starting from the densities of the final copolymer and the first copolymer. Then the Subscripts b, 1 and 2 refer to the overall mixture b (=second copolymer mixture), component 1 (=first copolymer) and component 2 (=second copolymer), respectively.

$$\rho_b = w_1 \cdot \rho_1 + w_2 \cdot \rho_2 \quad \text{Equation 5: Density mixing rule}$$

where ρ is the density in $kg/m^3$, w is the weight fraction of the component in the mixture and subscripts b, 1 and 2 refer to the overall mixture b, component 1 and component 2, respectively.

Within the scope of the invention is advantageous, that the density of the second copolymer is lower than the density of the first copolymer.

It is preferred, that the density of the second copolymer is below 900 $kg/m^3$, such as at most 898 $kg/m^3$, or 897 $kg/m^3$ or below, or 895 $kg/m^3$ or below or 892 $kg/m^3$ or below, or 890 $kg/m^3$ or below when calculated according to Equation 5.

Further within the scope of the invention it is preferred, that the density of the second copolymer is at least 880 $kg/m^3$, such as at least 883 $kg/m^3$ or at least 885 $kg/m^3$. It is further preferable, that the density of the second copolymer is within the range of 880-<900.0 $kg/m^3$, such as 885-898 $kg/m^3$, such as 885-897 $kg/m^3$.

It is therefore preferred if the a second copolymer of ethylene comprises a second alpha-olefin comonomer having 6 to 10 carbon atoms, and has a density of below 900 $kg/m^3$ when calculated according to Equation 5, based on values determined according to ISO 1183.

The ratio (i.e. the split) between the first and the second copolymer within the final multimodal copolymer of ethylene and at least two alpha-olefin-comonomers has significant effect on the mechanical properties of the final composition.

It is hence envisaged within the scope of the invention that the second copolymer of ethylene forms a significant part of the polymer fractions present in the multimodal ethylene copolymer, i.e. at least 50 wt. % of the final composition, preferably 53 wt. % or more, such as 55 wt. % or more. More preferably the second copolymer of ethylene may form about 60 wt. % or more, such as 65 wt. % or more of the multimodal copolymer of the present invention. The second copolymer of ethylene may form up to 70 wt % of the multimodal copolymer of the present invention.

Consecutively the first copolymer of ethylene forms at most 50 wt. % or less of the multimodal ethylene copolymer of the current invention, preferably 47 wt. % or less, such as 45 wt. % or less. More preferably the first copolymer of ethylene may form about 40 wt. % or less, such as 35 wt. % of the multimodal copolymer of the present invention. The first copolymer of ethylene preferably forms at least 30 wt % of the multimodal copolymer of the present invention.

Hydrogen feed is adjusted to achieve a desired melt flow rate (or molecular weight) of the second copolymer mixture. Suitably the hydrogen feed is controlled to maintain constant hydrogen to ethylene ratio in the reaction mixture. The actual ratio depends on the catalyst as well as the type of the polymerization. The desired polymer properties have been obtained in gas phase polymerization in a fluidized bed reactor by maintaining the ratio within the range of from 1 to 20 mol/kmol, preferably from 1 to 10 mol/kmol.

The second alpha-olefin comonomer is typically introduced to maintain a constant comonomer to ethylene ratio in the reaction mixture. The comonomer to ethylene ratio that is needed to produce a polymer with the desired density depends, among others, on the type of comonomer and the type of catalyst. With 1-hexene as a comonomer the desired polymer properties have been obtained in gas phase polymerization in a fluidized bed reactor with a molar ratio of 1-hexene to ethylene of from 500 to 1000 mol/kmol, preferably from 600 to 950 mol/kmol and in particular from 650 to 950 mol/kmol.

Preferably the second polymerization stage is conducted as a fluidized bed gas phase polymerization. In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practice. An overview is given, among others in Geldart: Gas Fluidization Technology, J. Wiley & Sons, 1986.

When the fluidization gas is contacted with the bed containing the active catalyst the reactive components of the gas, such as monomers, comonomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar. The average residence time in the third polymerization stage is typically from 40 to 240 minutes, preferably from 60 to 180 minutes.

Prepolymerization

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar. The amount of monomer is typically such that from about 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein. It is understood within the scope of the invention, that the amount or polymer produced in the prepolymerization lies within 1-5 wt. % in respect to the final multimodal copolymer.

Catalyst

The polymerization is conducted in the presence of an olefin polymerization catalyst. The catalyst may be any catalyst which is capable of producing the desired ethylene polymer. Suitable catalysts are, among others, Ziegler-Natta catalysts based on a transition metal, such as titanium, zirconium and/or vanadium catalysts. Ziegler Natta catalysts are useful as they can produce polymers within a wide range of molecular weight with a high productivity.

Ziegler-Natta catalysts are preferred within the scope of the invention. Suitable Ziegler-Natta catalysts preferably contain a magnesium compound, an aluminium compound and a titanium compound, optionally supported on a particulate support. The particulate support can be an inorganic oxide support, such as silica, alumina, titania, silicaalumina and silica-titania. Preferably, the support is silica.

The average particle size of the silica support can be typically from 10 to 100 µm. However, it has turned out that special advantages can be obtained if the support has median particle size from 6 to 40 µm, preferably from 6 to 30 µm. The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride. The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235. Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed.

The principles of preparation of these types of catalysts are given in WO-A-2003/106510 of *Borealis*. The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxycompounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly useful.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Film Preparation

Films are produced by extrusion through an annular die with a pressure difference applied to blow the extruded cylinder into a film and achieve the desired orientation within the film, i.e. to build a stress into the cooled film.

For film formation the polymer is ideally intimately mixed with any other components present prior to extrusion and blowing of the film as is well known in the art. It is especially preferred to thoroughly blend the components, for example using a twin screw extruder, preferably a counter-rotating extruder prior to extrusion and film blowing.

The films of the invention are uniaxially oriented. That means that they are stretched in at least a single direction, the machine direction. Ideally, the films are stretched in the machine direction only.

The preparation of a uniaxially oriented multilayer film of the invention comprises at least the steps of forming a layered film structure and stretching the obtained multilayer film in a draw ratio of at least 1:1.5, preferably at least 1:2. Maximum stretch may be 1:6, such as 1:5.

Typically the compositions providing the layers of the film will be blown i.e. (co)extruded at a temperature in the range 160° C. to 240° C., and cooled by blowing gas (generally air) at a temperature of 10 to 50° C. to provide a frost line height of 1 or 2 to 8 times the diameter of the die. The blow up ratio should generally be in the range 1.2 to 6, preferably 1.5 to 4.

It is preferred if the film of the invention is a monolayer film.

The obtained film is subjected to a subsequent stretching step, wherein the film is stretched in the machine direction. Stretching may be carried out by any conventional technique using any conventional stretching devices which are well known to those skilled in the art.

Stretching is preferably carried out at ambient temperature, such as in the range 20-35° C. e.g. about 20 to 25° C. Any conventional stretching rate may be used, e.g. 2 to 40%/second.

The film is stretched only in the machine direction to be uniaxial. The effect of stretching in only one direction is to uniaxially orient the film.

The film is stretched at least 1.5 times. This is stated herein as a draw ratio of at least 1:1.5, i.e. "1" represents the original length of the film and "1.5" denotes that it has been stretched to 1.5 times that original length. Preferred films of the invention are stretched in a draw ratio of at least 1:2, more preferably between 1:2 and 1:4, e.g. between 1:2 and 1:3. An effect of stretching (or drawing) is that the thickness of the film is similarly reduced. Thus a draw ratio of at least 1:3 preferably also means that the thickness of the film is reduced to less than the original thickness, Blow extrusion and stretching techniques are well known in the art, e.g. in EP-A-299750.

The film preparation process steps of the invention are known and may be carried out in one film line in a manner known in the art. Such film lines are commercially available.

The films of the invention typically have a starting (or original) thickness of 100 m or less. The films should have a starting thickness of at least 10 microns.

After stretching, the final thickness of the uniaxially oriented films, of the invention is typically 8 µm to 80 µm, more preferably 10 to 50 µm, ideally 10 to 30 µm.

Films

Films of the invention comprise the multimodal copolymer of ethylene and at least two alpha-olefin comonomers as hereinbefore defined. The films of the invention are monoaxially orientated in the machine direction. Films according to the present invention may be mono- or multilayer films, comprising one or more layers, such as two, three or five layers, even up to seven, up to 9 or up to 12 layers. Monolayer films are preferred.

In multilayer films comprising the multimodal copolymer of ethylene and at least two alpha olefin-comonomers according to the present invention, the multimodal copolymer according to the present invention may be contained by at least one of the layers.

It is within the scope of the present invention, that a monolayer film may comprise 1-100 wt % of the multimodal copolymer according to the present invention. It is also within the scope of the invention that such monolayer film can comprise 10-90 wt. %, such as 30-70 wt. %, or like 40-60 wt. % or 45-55 wt. % of the multimodal copolymer.

However, a monolayer film comprising 80 to 100% of the multimodal copolymer of the present invention is preferred, such as 80 to 98 wt %. It will be appreciated that the film may contain small amounts of additives as is standard in the art and a film comprising 100% of the polymer of the invention can contain such additives.

It is further within the scope of the present invention, that each layer of a multilayer film independently from the others may comprise 1-100 wt. % of the multimodal copolymer according to the present invention. It is preferred, that each layer independently from the others comprises 10-98 wt. %, such as 30-70 wt. %, or like 40-60 wt. % or 45–55 wt. % of the multimodal copolymer according to the present invention.

Film Properties

The films of the invention may have an Elmendorf tear resistance of at least 310 N/mm in the TD, such as at least 375 N/mm.

The films of the invention may have an Elmendorf tear resistance of at least 90 N/mm in the MD, such as at least 100 N/mm.

The films of the invention preferably have Normalised peak force of 2000 to 3500 N/mm, such as 2250 to 2750 N/mm.

Normalised energy to peak force may be 30 to 120 J/mm, such as 50 to 120 J/mm.

Normalised total penetration energy may be 30 to 90 J/mm, such as 35 to 80 J/mm.

It is within the scope of the present invention that the films of the invention comprise additives as used in the art, such as phenolic stabilizers, antioxidants, slip and antistatic agents, antiblock agents processing aids etc.

Applications

The films of the invention are preferably used in packaging silage. The invention therefore relates to a method for the manufacture of silage comprising wrapping plant material such as green vegetation in a film as hereinbefore defined so as to form a bale;

allowing the plant material to undergo anaerobic fermentation to form silage.

The invention will now be described with reference to the following non-limiting examples and figures.

DETERMINATION METHODS

Figure 1:
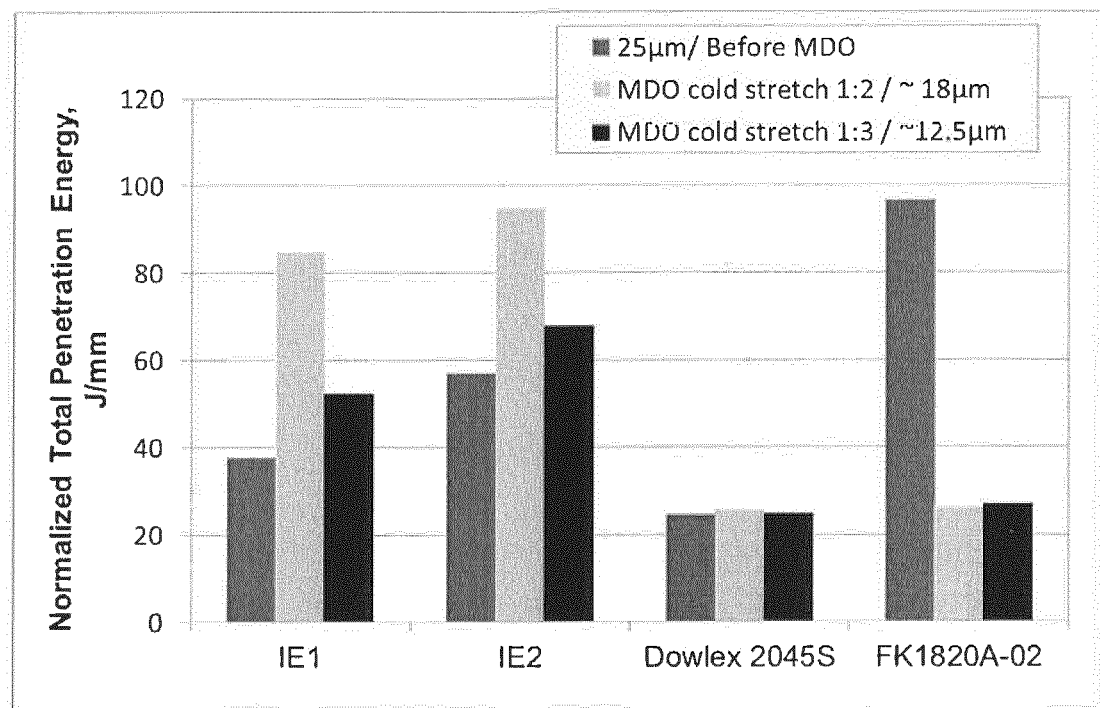
FIG. 1 shows penetration energy values before stretching for the polymers of the invention vs the prior art comparative examples and then looks at values after stretching 1:2 and 1:3 times in the machine direction.
Figure 2:
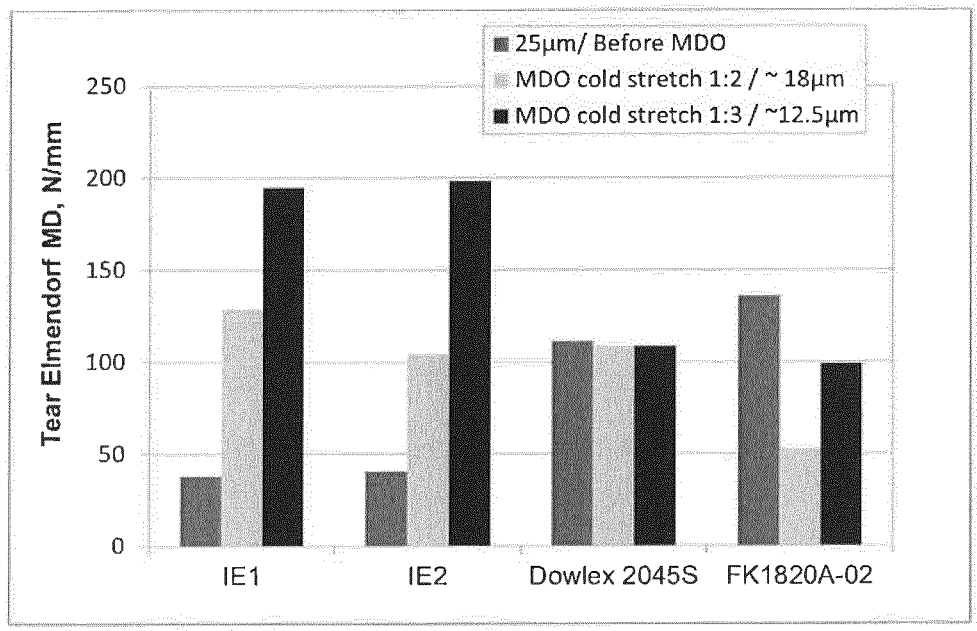
FIG. 2 shows Elmendorf tear values before stretching for the polymers of the invention vs the prior art comparative examples and then looks at values after stretching 1:2 and 1:3 times in the machine direction. Results are for MD tear.
Figure 3:
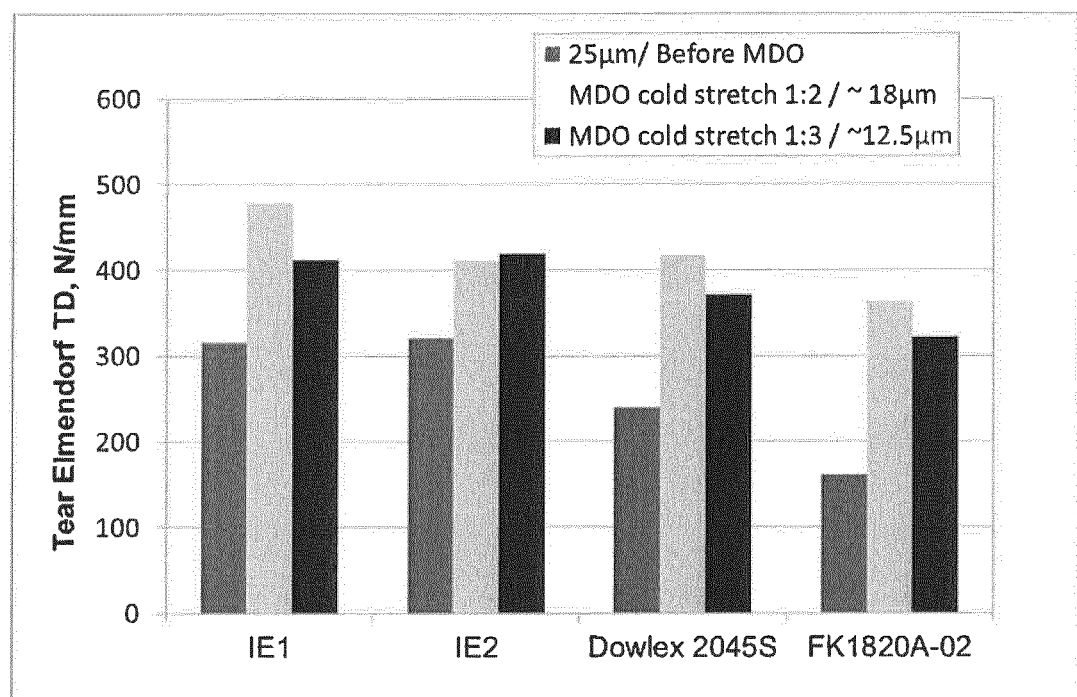
FIG. 3 shows Elmendorf tear values before stretching for the polymers of the invention vs the prior art comparative examples and then looks at values after stretching 1:2 and 1:3 times in the machine direction. Results are for TD tear.

Melt flow rate (MFR) was determined according to ISO 1133 at 190° C. The load under which the measurement is conducted is given as a subscript. Thus, the MFR under the load of 2.16 kg is denoted as MFR2. The melt flow rate MFR21 is correspondingly determined at 190° C. under a load of 21.6 kg and MFR5 under a load of 5 kg.

The melt index MFR is herein assumed to follow the mixing rule given in Equation 4 (Hagström formula):

$$MI_b = \left( w \cdot MI_1^{-\frac{w-b}{a}} + (1-w) \cdot MI_2^{-\frac{w-b}{a}} \right)^{-a \cdot w^b}$$

As proposed by Hagström, a=10.4 and b=0.5 for MFR21. Further, unless other experimental information is available, MFR21/MFR2 for one polymer component (i.e. first copolymer or second copolymer) can be taken as 30. Furthermore, w is the weight fraction of the polymer component having higher MFR. The first copolymer can thus be taken as the component 1 and the second copolymer as the component 2. The MFR21 of the second copolymer (MI2) can then be solved from equation 1 when the MFR21 of the first copolymer mixture (MI1) and the second copolymer mixture (MIb) are known.

It is herewith stated, that the following expressions are to be understood as defined: "MFR2 loop1" is understood as the MFR of the polymer available after the first loop, comprising the "first fraction of the first copolymer" and optionally any polymer fraction produced in the prepolymerization-step (if any).

"Density Loop1" is understood as the density of the polymer available after the first loop, comprising the first fraction of the first copolymer and optionally any polymer fraction produced in the prepolymerization-step (if any).

"MFR2 loop2" or "MFR2 after loop2" is understood as the MFR of the polymer available after the second loop, i.e. comprising the first fraction of the first copolymer and the second fraction of the first copolymer and optionally polymer produced in any prepolymerization-step (if any).

The MFR2 of the polymer fraction produced in the second loop (i.e. the second fraction of the first copolymer) is to be calculated according to Equation 4: Hagström formula and denominates as "MFR2 of the second loop", i.e. the MFR2 of second fraction of the first copolymer.

Log $MFR2$(loop)=$n$*log $MFI$(split1)+(1−$n$)*log $MFR$ (split2)   Equation 6: MFR mixing rule "Loop density after Loop2" (or "Density Loop2) is understood as the density of the polymer available after the second loop, i.e. comprising the first fraction of the first copolymer and the second fraction of the first copolymer and optionally polymer produced in any prepolymerization—step (if any).

The density of the polymer fraction produced in the second loop (i.e. the density of the second fraction of the first copolymer) is to be calculated according to Equation 5: Density mixing rule $$\rho_b = w_1 \cdot \rho_1 + w_2 \cdot \rho_2$$

"Final MFR21" is understood as the MFR of the polymer available after the gas phase reactor (GPR), i.e. comprising all the polymer fractions produced in any preceding polymerization step, i.e. comprising the first fraction and the second fraction of the first copolymer, the high molecular-weight fraction produced in the GPR and optionally polymer produced in any prepolymerization-step (if any). "GPR MFR2" denominates the MFR of the polymer fraction produced in the GPR and is to be calculated according to Equation 4.

Density

Density of the polymer was measured according to ISO 1183-1:2004 Method A on compression moulded specimen prepared according to EN ISO 1872-2 (February 2007) and is given in kg/m3. The density is herein assumed to follow the mixing rule as given in Equation 5: Density mixing rule $$\rho_b = w_1 \cdot \rho_1 + w_2 \cdot \rho_2$$

Herein ρ is the density in kg/m3, w is the weight fraction of the component in the mixture and subscripts b, 1 and 2 refer to the overall mixture b, component 1 and component 2, respectively. "Density of GPR (calc)" has been calculated according to Equation 5 accordingly.

Molecular Weights, Molecular Weight Distribution, Mn, Mw, MWD

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 μL of sample solution were injected per analysis. The column set was calibrated using universal calibration (according to ISO 16014-2:2003) with 10 narrow MWD polystyrene (PS) standards in the range of 1.05 kg/mol to 11 600 kg/mol. Mark Houwink constants were used for polystyrene and polyethylene (K: 19×10$^{-3}$ dL/g and a: 0.655 for PS, and K: 39×10$^{-3}$ dL/g and a: 0.725 for PE). All samples were prepared by dissolving 0.5-3.5 mg of polymer in 4 mL (at 140° C.) of stabilized TCB (same as mobile phase) and keeping for 2 hours at 140° C. and for another 2 hours at 160° C. with occasional shaking prior sampling in into the GPC instrument.

Comonomer Determination (NMR Spectroscopy)

Quantitative nuclear-magnetic resonance (NMR) spectroscopy was used to quantify the comonomer content of the polymer Quantitative 13C{1H} NMR spectra recorded in the molten-state using a Bruker Advance III 500 NMR spectrometer operating at 500.13 and 125.76 MHz for 1H and 13C respectively. All spectra were recorded using a 13C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {[1], [2], [6]} Standard single-pulse excitation was employed utilising the transient NOE at short recycle delays of 3 s {[1], [3]} and the RS-HEPT decoupling scheme {[4], [5]}. A total of 1024 (1 k) transients were acquired per spectrum. This setup was chosen due its high sensitivity towards low comonomer contents. Quantitative 13C{1H} NMR spectra were processed, integrated and quantitative properties determined using custom spectral analysis automation programs. All chemical shifts are internally referenced to the bulk methylene signal (S+) at 30.00 ppm {[9]}. Characteristic signals corresponding to the incorporation of 1-hexene were observed {[9]} and all contents calculated with respect to all other monomers present in the polymer.

$$H = I^* B4$$

With no other signals indicative of other comonomer sequences, i.e. consecutive comonomer incorporation, observed the total 1-hexene comonomer content was calculated based solely on the amount of isolated 1-hexene sequences:

$$H\text{total} = H$$

Characteristic signals resulting from saturated end-groups were observed. The content of such saturated end-groups was quantified using the average of the integral of the signals at 22.84 and 32.23 ppm assigned to the 2 s and 2 s sites respectively:

$$S=(½)*(I2S+I3S)$$

The relative content of ethylene was quantified using the integral of the bulk methylene (δ+) signals at 30.00 ppm:

$$E=(½)*I\delta+$$

The total ethylene comonomer content was calculated based the bulk methylene signals and accounting for ethylene units present in other observed comonomer sequences or end-groups:

$$E\text{total}=+(5/2)*B+(3/2)*S$$

The total mole fraction of 1-hexene in the polymer was then calculated as:

$$fH=(H\text{total}/(E\text{total}+H\text{total})$$

The total comonomer incorporation of 1-hexene in mole percent was calculated from the mole fraction in the usual manner:

$$H[\text{mol \%}]=100*fH$$

The total comonomer incorporation of 1-hexene in weight percent was calculated from the mole fraction in the standard manner: H [wt %]=100*(fH*84.16)/(fH*84.16)+((1-fH)*28.05))

[1] Klimke, K., Parkinson, M, Piel, C., Kaminsky, W., Spiess, Wilhelm, M., Macromol.
Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Resn. 2005, 176, 239
[5] Griffin, J. M., Tripon, C., Samoson, A., Filip, C., and Brown, S. P., Mag. Res. in Chem. 2007 45, Si, S198
[6] Castignolles, P., Graf, R., Parkinson, M., Wilhelm, M., Gaborieau, M., Polymer 50 (2009) 2373
[7] Zhou, Z., Kuemmerle, R., Qiu, X., Redwine, D., Cong, R., Taha, A., Baugh, D. Winniford, B., J. Mag. Reson. 187 (2007) 225
[8] Busico, V., Carbonniere, P., Cipullo, R., Pellecchia, R., Severn, J., Talarico, G., Macromol. Rapid Commun. 2007, 28, 1128
[9] J. Randall, Macromol. Sci., Rev. Macromol. Chem. Phys. 1989, C29, 201.

Draw Down Ratio (DDR):
Speed of the haul off/Speed of the extruder (represents MD orientation)
It indicates the final thickness reduction in the melt after blowing. It is the ratio between the speed of the haul off over the speed of the extruder and often estimated by using the following equation:

$$DDR=\text{Width of the die gap}/(\text{Film thickness}\times BUR)$$

A drawdown ratio greater than 1 indicates that the melt has been pulled away from the die faster than it issued from the die. The film has been thinned and possesses an orientation in the machine direction (MD).

Blow Up Ratio (BUR):
Diameter of the bubble/Diameter of the die (represents TD orientation)
BUR indicates the increase in the bubble diameter over the die diameter. A blow-up ratio greater than 1 indicates the bubble has been blown to a diameter greater than that of the die orifice. The film has been thinned and possesses an orientation in the transverse direction (TD).

Peak Force Penetration Energy
Determination of Instrumented Puncture Impact of the Films According to ISO 7765-2:
The method used to assess the behavior of plastic films in impact stress perpendicular to the film plane and allowed by electronic acquisition of measured values, the energy absorption capacity, the puncture force and the compare deformability of the films.

In order to assess the puncture impact properties of the plastic film, the film specimen is punctured at its centre using a non-lubricated striker, perpendicularly to the test-specimen surface, at a nominally uniform velocity of 4.4 m/s and 23° C. The test specimen is clamped in position during the test (support ring diameter of 40 mm). The force-deflection or force-time diagram is recorded electronically by the instrumented striker with a diameter of 20 mm. From these force-deflections several features and parameters of the material behaviour can be inferred, such as Peak Force is the maximum force occurring during the test in Newtons (N)
Deformation at peak force: is the deformation that occurs at the peak force in millimetres (mm)
Energy to peak force is the area under the force-deflection curve up to the deflection at peak force in Joules (J)
Total Penetration Energy: The total energy expended in penetrating the test specimen in Joules (J)
For normalized values, the respective parameter is divided by the film thickness in millimetres.

Tear resistance (determined as Elmendorf tear (N): Applies for the measurement both in machine direction and in transverse direction. The tear strength is measured using the ISO 6383/2 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film.

Catalyst Preparation
Complex Preparation:
87 kg of toluene was added into the reactor. Then 45.5 kg Bomag A (Butyoctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:
275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 litres pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl4 was added during 0.5 hours at 45° C. The slurry was stirred at 40° C. for five hours. The catalyst was then dried by purging with nitrogen.

Polymerization:

Inventive Examples IE1-IE2

A loop reactor having a volume of 50 d$^3$ was operated at a temperature of 70° C. and a pressure of 63 bar. Into the reactor were ethylene, 1-butene, propane diluent and hydrogen so that the feed rate of ethylene was 2.0 kg/h, hydrogen was 5.0 g/h, 1-butene was 80 g/h and propane was 50 kg/h. Also 11 g/h of a solid polymerization catalyst component produced as described above was introduced into the reactor together with triethylaluminium cocatalyst so that the molar ratio of Al/Ti was about 15. The production rate was 1.9 kg/h. A stream of slurry was continuously withdrawn and directed to a loop reactor having a volume of 150 dm$^3$ and which was operated at a temperature of 85° C. and a pressure of 61 bar. Into the reactor were further fed additional ethylene, propane diluent, 1-butene comonomer and hydrogen so that the ethylene concentration in the fluid mixture was 2.9-5.1% by mole, the hydrogen to ethylene ratio was 250-1000 mol/kmol, the 1-butene to ethylene ratio was 300-3300 mol/kmol and the fresh propane feed was 41 kg/h. The production rate was 7-21 kg/h.

A stream of slurry from the reactor was withdrawn intermittently and directed into a loop reactor having a volume of 350 dm3 and which was operated at 85° C. temperature and 54 bar pressure. Into the reactor was further added fresh propane feed of 69 kg/h and ethylene, 1-butene and hydrogen so that the ethylene content in the reaction mixture was 19-4.7 mol %, the molar ratio of 1-butene to ethylene was 520-1260 mol/kmol and the molar ratio of hydrogen to ethylene was 230-500 mol/kmol. The production rate was 13-26 kg/h. The slurry was withdrawn from the loop reactor intermittently by using settling legs and directed to a flash vessel operated at a temperature of 50° C. and a pressure of 3 bar. From there the polymer was directed to a fluidized bed gas phase reactor operated at a pressure of bar and a temperature of 80° C. Additional ethylene, 1-hexene comonomer, nitrogen as inert gas and hydrogen were added so that the ethylene content in the reaction mixture was 13-25 mol-%, the ratio of hydrogen to ethylene was 4-33 mol/kmol and the molar ratio of 1-hexene to ethylene was 7-370 mol/kmol. The polymer production rate in the gas phase reactor was 43-68 kg/h and thus the total polymer withdrawal rate from the gas phase reactor was about 115 kg/h. The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 230 kWh/ton and the melt temperature 260° C.

The polymers in table 2 were converted into 25 μm films on a Collin monolayer film extruder applying a draw down ratio (DDR) of 30.

Machine-settings: L/D ratio: 30; die gap: 1.5 mm, die diameter: 60, blow up ratio (BUR) 2.5; frost line height: 120 mm.

Temperature Profile:
MFR5>1.2-2.0: 80 160 180 180 180 180 180 180 180° C.
MFR5>2.0-5.0: 80 150 160 160 160 160 160 160 160° C.

The 25 micron films are then stretched in the machine direction at a roller temperature of 22° C. Stretching was carried out using a monodirectional stretching machine manufactured by Hosokawa Alpine AG in Augsburg/Germany. The film obtained from blown film extrusion was pulled into the orientation machine then stretched between two sets of nip rollers where the second pair runs at higher speed than the first pair resulting in the desired draw ratio. Stretching is carried out with the draw ratios presented in Table 3. After exiting the stretching machine the film is fed into a conventional film winder where the film is slit to its desired width and wound to form reels.

TABLE 1 characteristics of materials used for the study

| LLDPE material | Modality | Comonomer | Density, kg/m$^3$ | MFR5, g/10 min | MF g/10 min. |
|---|---|---|---|---|---|
| IE1 | Bimodal | C4-loops/C6-GPR | 920 | 1.9 | |
| IE2 | Bimodal | C4-loops/C6-GPR | 917 | 2.3 | |
| Dowlex 2045S | | C8 | 920 | | 1.0 |
| FK1820A-02 | Bimodal | | 918 | | 1.5 |

TABLE 2 physical parameters reflecting the polymer structure of LLDPE

| Parameters | Unit | IE1 | IE2 |
|---|---|---|---|
| Loop 1 density | kg/m$^3$ | 951.8 | 951.9 |
| Loop 1 MFR$_2$ | g/10 min | 189 | 206 |
| Loop 2 density | kg/m$^3$ | 952.1 | 953 |
| Loop 2 MFR$_2$ | g/10 min | 240 | 348 |
| GPR split | % | 58.1 | 58.1 |
| GPR density | kg/m$^3$ | 896.9 | 891.4 |
| Pellet density | kg/m$^3$ | 920 | 917 |
| Pellet MFR$_5$ | g/10 min | 1.9 | 2.3 |

TABLE 3

| | | IE1 | IE2 | Dowlex 2045S | FK1820A-02 |
|---|---|---|---|---|---|
| MFR2 | | | | 1.0 | 1.5 |
| MFR5 | | 1.9 | 2.3 | | |
| Density | | 920 | 917.2 | 920 | 918 |
| Before MDO Stretching | | | | | |
| BUR | — | 1:2.5 | 1:2.5 | 1:2.5 | 1:2.5 |
| Blown film thickness | μm | 25 μm | 25 μm | 25 μm | 25 μm |
| melt T ° C. | ° C. | 223 | 222 | 228 | 230 |
| melt pressure before | bar | 155 | 141 | 169 | 144 |
| screw speed | rpm | 70 | 75 | 66 | 78 |
| Take-off speed | m/min | 25.9 | 26.0 | 26.3 | 25.6 |
| FLH, mm | mm | 700 | 600 | 700 | 700 |

TABLE 3-continued

|  |  |  | IE1 | IE2 | Dowlex 2045S | FK1820A-02 |
|---|---|---|---|---|---|---|
| Puncture, ISO 7765-2 | Peak Force | N | 37.6 | 38.7 | 30.4 | 39.0 |
|  | Deformation @ Peak Force | mm | 32.2 | 44 | 26.7 | 61.1 |
|  | Total Penetration Energy | J | 0.9 | 1.3 | 0.6 | 2.2 |
|  | Film thickness | mm | 0.025 | 0.023 | 0.023 | 0.023 |
|  | Normalised Peak Force | N/mm | 1505.7 | 1680.8 | 1322.7 | 1696.4 |
|  | Normalized Energy to Peak Force | J/mm | 32 | 51 | 23.5 | 76 |
|  | Normalized Total Penetration Energy | J/mm | 37.7 | 57 | 24.5 | 96.4 |
| Tear Elmendorf, ISO6383-2 MD | Relative Tear Resistance | N/mm | 37.97 | 40.87 | 111.55 | 136.2 |
| Tear Elmendorf, ISO6383-2 TD | Relative Tear Resistance | N/mm | 315.75 | 321.17 | 239.63 | 160.45 |

TABLE 4

| Film testing after MDO Stretching 1:2 |  |  | IE1 | IE2 | Dowlex 2045S | FK1820A-02 |
|---|---|---|---|---|---|---|
| MDO Stretch 1:2 | Initial thickness | μm | 25 | 25 | 25 | 25 |
|  | Final thickness | μm | 18 | 20 | 17 | 20 |
|  | Stretch Ratio |  | 1:2 | 1:2 | 1:2 | 1:2 |
|  | Initial Width | mm | 600 | 600 | 600 | 600 |
|  | Final Width | mm | 350 | 350 | 350 | 350 |
|  | T ° C. Stretching Roll | ° C. | 22 | 22 | 22 | 22 |
| Puncture, ISO7765-2 | Peak Force | N | 39.1 | 39.2 | 23.9 | 26.1 |
|  | Deformation @ Peak Force | mm | 46.5 | 54.7 | 19.8 | 21.6 |
|  | Total Penetration Energy | J | 1.3 | 1.4 | 0.4 | 0.4 |
|  | Film thickness | μm | 15 | 15 | 16 | 16 |
|  | Normalised Peak Force | N/mm | 2610 | 2615.9 | 1491.9 | 1633.5 |
|  | Normalized Energy to Peak Force | J/mm | 82.6 | 93.8 | 18.8 | 22.1 |
|  | Normalized Total Penetration Energy | J/mm | 84.6 | 94.7 | 25.5 | 26 |
| Tear Elmendorf, ISO6383-2 MD | Relative Tear Resistance | N/mm | 129 | 104.39 | 108.94 | 53.17 |
| Tear Elmendorf, ISO6383-2 TD | Relative Tear Resistance | N/mm | 478.76 | 411.02 | 417.44 | 362.9 |

TABLE 5

| Film testing after MDO Stretching 1:3 |  |  | IE1 | IE2 | Dowlex 2045S | FK1820A-02 |
|---|---|---|---|---|---|---|
| MDO Stretch 1:3 | Initial thickness | μm | 25 | 25 | 25 | 25 |
| 4.4 m/s, 23° C. | Final thickness | μm | ~12.5 | ~12.5 | ~12.5 | ~12.5 |
|  | Stretch Ratio |  | 1:3 | 1:3 | 1:3 | 1:3 |
|  | Initial Width | mm | 600 | 600 | 600 | 600 |
|  | Final Width | mm | 350 | 350 | 350 | 350 |
|  | T ° C. Stretching Roll | ° C. | 22 | 22 | 22 | 22 |
| Puncture, ISO7765-2 | Peak Force | N | 36.1 | 35.3 | 22.1 | 26.1 |
|  | Peak Force SD |  | 1.1 | 2.7 | 1.8 | 3.1 |
|  | Deformation @ Peak Force | mm | 22.3 | 33.1 | 20 | 17.8 |
|  | Total Penetration Energy | J | 0.6 | 0.8 | 0.3 | 0.3 |
|  | Film thickness | μm | 12 | 12 | 2 | 12 |
|  | Normalised Peak Force | N/mm | 3007.4 | 2942.6 | 1842.7 | 2175 |
|  | Normalized Energy to Peak Force | J/mm | 32.3 | 59.8 | 22 | 21 |
|  | Normalized Total Penetration Energy | J/mm | 52.2 | 67.9 | 24.7 | 27 |
| Tear Elmendorf, ISO6383-2 MD | Relative Tear Resistance | N/mm | 194.91 | 198.45 | 108.57 | 99.05 |
| Tear Elmendorf, ISO6383-2 TD | Relative Tear Resistance | N/mm | 411.7 | 419.41 | 371.63 | 321.64 |

TABLE 6

| Summary |  |  | IE1 | IE2 | Dowlex 2045S | FK1820A-02 |
|---|---|---|---|---|---|---|
| Before stretching | Normalised Peak Force | N/mm | 1505.7 | 1680.8 | 1322.7 | 1696.4 |
|  | Normalized Energy to Peak Force | J/mm | 32 | 51 | 23.5 | 76 |
|  | Normalized Total Penetration Energy | J/mm | 37.7 | 57 | 24.5 | 96.4 |
| 1:2 stretch | Normalised Peak Force | N/mm | 2610 | 2615.9 | 1491.9 | 1633.5 |
|  | Normalized Energy to Peak Force | J/mm | 82.6 | 93.8 | 18.8 | 22.1 |
|  | Normalized Total Penetration Energy | J/mm | 84.6 | 94.7 | 25.5 | 26 |

TABLE 6-continued

| Summary | | | IE1 | IE2 | Dowlex 2045S | FK1820A-02 |
|---|---|---|---|---|---|---|
| 1:3 stretch | Normalised Peak Force | N/mm | 3007.4 | 2942.6 | 1842.7 | 2175 |
| | Normalized Energy to Peak Force | J/mm | 32.3 | 59.8 | 22 | 21 |
| | Normalized Total Penetration Energy | J/mm | 52.2 | 67.9 | 24.7 | 27 |

Materials show major increases in peak force, and penetration energy.

TABLE 7

Data in full

| Lot | split 1-2 | Loop1 Density | Loop1 MFR2 | split 2-2 | Loop2 Density | Loop2 MFR2 | GPR Split | GPR Powder Density | GPR Powder MFR5 | GPR MFR21 | Pellet Density | Pellet MFR5 | Pellet MFR21 | FRR 21/5 | Final MFR2 | GPR Density |
|---|---|---|---|---|---|---|---|---|---|---|---|---|---|---|---|---|
| IE1 | 16.9 | 951.8 | 189 | 22.8 | 952.1 | 240 | 58.1 | 916.5 | 1.73 | 43 | 920 | 1.9 | 45.8 | 24.11 | 0.49415 | 896.9 |
| IE2 | 16.7 | 951.9 | 206 | 23 | 953 | 348 | 58.1 | 916.4 | 0.61 | 21 | 917.2 | 2.3 | 57.2 | 24.87 | 0.59818 | 891.4 |

The invention claimed is:

1. A machine direction oriented (MDO) monolayer film comprising a multimodal copolymer of ethylene and at least two alpha-olefin-comonomers having:
   a) a density of from 906 to 925 kg/m³ determined according to ISO 1183,
   b) an $MFR_{21}$ of 10 to 200 g/10 min determined according to ISO1133,
   wherein the multimodal copolymer of ethylene comprises
   c) a first copolymer of ethylene and a first alpha-olefin comonomer having 4 to 10 carbon atoms; and
   d) a second copolymer of ethylene having an alpha-olefin comonomer different from that of the first copolymer, said second alpha-olefin comonomer having 6 to 10 carbon atoms; and
   wherein the machine directed oriented monolayer film has been stretched uniaxially in the machine direction (MD) in a draw ratio of at least 1:1.5.

2. The MDO monolayer film as claimed in claim 1 which has been stretched uniaxially in the machine direction (MD) in a draw ratio of at least 1:2.

3. The MDO monolayer film as claimed in claim 1 wherein the multimodal copolymer of ethylene comprises
   50 wt % or less of the first copolymer of ethylene;
   50 wt % or more of the second copolymer of ethylene.

4. The MDO monolayer film as claimed in claim 1 wherein the first copolymer of ethylene has
   i) a density of from 945 to 955 kg/m³; and
   ii) a melt flow rate $MFR_2$ of 150 to 1500 g/10 min.

5. The MDO monolayer film as claimed in claim 1 wherein the second copolymer of ethylene has a density of ≤903 kg/m³
when calculated according to Equation 5 based on values determined according to ISO 1183:

$$\rho_b = w_1 \cdot \rho_1 + w_2 \cdot \rho_2 \quad \text{Equation 5,}$$

where ρ is density in kg/m³, w is weight fraction of component in a mixture and subscripts b, 1 and 2 refer to the mixture b, component 1 (first copolymer) and component 2 (second copolymer), respectively.

6. The MDO monolayer film as claimed in claim 1 wherein the second copolymer of ethylene has $MFR_{21}$ of <20 g/10 min when calculated according to Equation 4: Hagström formula:

$$MI_b = \left( w \cdot MI_1^{-\frac{w-b}{a}} + (1-w) \cdot MI_2^{-\frac{w-b}{a}} \right)^{-a \cdot w^b} \quad \text{Equation 4}$$

where a=10.4, b=0.5 for $MFR_{21}$, w is the weight fraction of the polymer component having higher MFR, $MI_b$ is the $MFR_{21}$ of the second copolymer mixture, $MI_1$ is $MFR_{21}$ of a first copolymer of ethylene, and $MI_2$ is $MFR_{21}$ of the second copolymer of ethylene.

7. The MDO monolayer film as claimed in claim 1 having a thickness of 10 to 30 microns after stretching.

8. The MDO monolayer film as claimed in claim 1 having one or more of:
   an Elmendorf tear resistance of at least 310 N/mm in the TD;
   an Elmendorf tear resistance of at least 90 N/mm in the MD;
   a normalised peak force of 2000 to 3500 N/mm;
   a normalised energy to peak force of 30 to 120 J/mm; and/or
   a normalised total penetration energy of 30 to 90 J/mm.

9. The MDO monolayer film as claimed in claim 1 wherein the first copolymer of ethylene has
   i) a density of from 945 to 955 kg/m³; and
   ii) a melt flow rate MFR2 of 150 to 1500 g/10 min.

10. A machine direction oriented (MDO) film comprising a multimodal copolymer of ethylene and at least two alpha-olefin-comonomers having:
    a) a density of from 906 to 925 kg/m³ determined according to ISO 1183,
    b) an $MFR_{21}$ of 10 to 200 g/10 min determined according to ISO1133,
    wherein the multimodal copolymer of ethylene comprises
    c) 35 to 50 wt % of a first copolymer of ethylene comprising at least a first and a second fraction; said first fraction comprising ethylene and a first alpha-olefin comonomer having 4 to 10 carbon atoms and said second fraction comprising ethylene and the first alpha-olefin comonomer having 4 to 10 carbon atoms said first and second fraction are present in a weight ratio of 2:1 up to 1:2; and
    d) 50 to 65 wt % of a second copolymer of ethylene having an alpha-olefin comonomer different from the first copolymer, said second alpha-olefin comonomer having 6 to 10 carbon atoms; and wherein the machine directed oriented film has been stretched uniaxially in the machine direction (MD) in a draw ratio of at least 1:1.5.

11. A machine direction oriented (MDO) film according to claim 10, wherein component (d) comprises a second copolymer of ethylene having an alpha-olefin comonomer different from the first copolymer having a density of below 900 kg/m$^3$ when calculated according to Equation 5, based on values determined according to ISO 1183:

$$\rho_b = w_1 \cdot \rho_1 + w_2 \cdot \rho_2 \quad \text{Equation 5,}$$

where $\rho$ is density in kg/m$^3$, w is weight fraction of component in a mixture and subscripts b, 1 and 2 refer to the mixture b, component 1 (first copolymer) and component 2 (second copolymer), respectively.

12. The MDO film as claimed in claim 10 wherein the first and the second fraction of the first copolymer of ethylene are produced in two consecutive steps.

13. The MDO film as claimed in claim 10 which has been stretched uniaxially in the machine direction (MD) in a draw ratio of at least 1:2.

14. The MDO film as claimed in claim 10 wherein the second copolymer of ethylene has a density of from ≤903 kg/m$^3$
when calculated according to Equation 3 based on values determined according to ISO 1183:

$$\tau = \frac{Vr}{Qo}, \quad \text{Equation 5}$$

where $\tau$ is residence time Vr is volume of the reaction space and Qo is volumetric flow rate of a product stream.

15. The MDO film as claimed in claim 10 wherein the second copolymer of ethylene has MFR$_{21}$ of <20 g/10 min when calculated according to Equation 4:

$$MI_b = \left( w \cdot MI_1^{-\frac{w-b}{a}} + (1-w) \cdot MI_2^{-\frac{w-b}{a}} \right)^{-a \cdot w^b} \quad \text{Equation 4}$$

where a=10.4, b=0.5 for MFR$_{21}$, w is the weight fraction of a polymer component having higher MFR, MI$_b$ is the MFR$_{21}$ of the second copolymer mixture, MI$_1$ is MFR$_{21}$ of the first copolymer of ethylene, and MI$_2$ is MFR$_{21}$ of the second copolymer of ethylene.

16. The MDO film as claimed in claim 10 having one or more of:
an Elmendorf tear resistance of at least 375 N/mm in the TD;
an Elmendorf tear resistance of at least 100 N/mm in the MD;
a normalised peak force of 2250 to 2750 N/mm;
a normalised energy to peak force of 50 to 120 J/mm and/or
a normalised total penetration energy of 35 to 80 J/mm.

17. A process for the preparation of the machine direction oriented film as claimed in claim 10 comprising:
in a first reactor polymerising ethylene and a first alpha-olefin comonomer having 4 to 10 carbon atoms to produce a first polyethylene fraction;
in a second reactor and in the presence of the first polyethylene fraction, polymerising ethylene and said first alpha-olefin comonomer having 4 to 10 carbon atoms to produce a second polyethylene fraction, said first and second polyethylene fractions forming a first copolymer of ethylene;
in a third reactor and in the presence of the first copolymer of ethylene, polymerising ethylene and a second alpha-olefin comonomer different from the first alpha-olefin comonomer, said second alpha-olefin comonomer having 6 to 10 carbon atoms to produce a second copolymer of ethylene;
said first and second copolymers of ethylene forming a multimodal copolymer of ethylene and at least two alpha-olefin-comonomers having:
a) a density of from 906 to 925 kg/m$^3$ determined according to ISO 1183,
b) an MFR$_{21}$ of 10-200 g/10 min determined according to ISO1133,
blowing said multimodal copolymer of ethylene to form a first film;
stretching said first film in a machine direction in a draw ratio of at least 1:1.5.

18. The process as claimed in claim 17 wherein the second copolmer of ethylene does not contain a residue of an alpha olefin with fewer than 6 carbons atoms or wherein there is at least one alpha olefin present in the second copolmer of ethylene which is different from any alpha olefin present in said first copolymer of ethylene.

* * * * *